United States Patent
Lee (10) Patent No.: US 6,381,898 B1
(45) Date of Patent: May 7, 2002

(54) REEL-SEAT ASSEMBLY

(76) Inventor: Tsung-Seng Lee, No. 8, Lane 264, Ching-Nien Rd., Tainan City (TW)

( * ) Notice: Subject to any disclaimer, the term of this patent is extended or adjusted under 35 U.S.C. 154(b) by 0 days.

(21) Appl. No.: 09/664,561

(22) Filed: Sep. 18, 2000

(51) Int. Cl.[7] ............................................. A01K 87/06
(52) U.S. Cl. ....................................................... 43/22
(58) Field of Search ............................................. 43/22

(56) References Cited

U.S. PATENT DOCUMENTS

| | | | |
|---|---|---|---|
| 2,656,639 A | * | 10/1953 | Phillipson |
| 4,485,580 A | * | 12/1984 | Ohmura ........................... 43/22 |
| 4,756,114 A | * | 7/1988 | Ohmura ........................... 43/22 |
| 5,481,820 A | * | 1/1996 | Ohmura ........................... 43/22 |
| 5,904,000 A | * | 5/1999 | Ohmura ........................... 43/22 |
| 6,067,740 A | * | 5/2000 | Alley ............................... 43/22 |
| 6,105,301 A | * | 8/2000 | Ohmura ........................... 43/22 |

FOREIGN PATENT DOCUMENTS

| | | | | |
|---|---|---|---|---|
| GB | 2 017 471 A | * | 10/1979 | .......... A01K/87/06 |
| GB | 2 194 871 A | * | 3/1988 | .......... A01K/87/06 |

* cited by examiner

Primary Examiner—Michael J. Carone
Assistant Examiner—Kimberly S. Smith
(74) Attorney, Agent, or Firm—Dougherty & Troxell (57) ABSTRACT

A reel-seat assembly mainly comprises a reel seat including a thread body, a fixed hood, a sliding hood, and a locking nut, wherein a choking block of the sliding hood is engaged with a choking groove of the locking nut so that both the sliding hood and the locking nut can move synchronously; the fixed hood is immobile; an arcuate groove of the sliding hood is matchable with an arcuate slat of the thread body for keeping respective groove gaps in the fixed hood and the sliding hood on a line in order to forbid a fixing piece (B) of reel foot (A) from revolving.

1 Claim, 8 Drawing Sheets

REEL-SEAT ASSEMBLY

BACKGROUND OF THE INVENTION

This invention relates generally to a reel seat, more particularly, it relates to a reel-seat assembly for fishing rod having a locking nut provided with a choking groove to be engaged with a choking block of sliding hood so that the locking nut is jointed together with the sliding hood, wherein an arcuate groove of the sliding hood is matchable with an arcuate slat on a thread body for keeping the relative positions of a groove gap of the sliding hood and a fixed hood unchanged to facilitate assembling.

Figure 1:
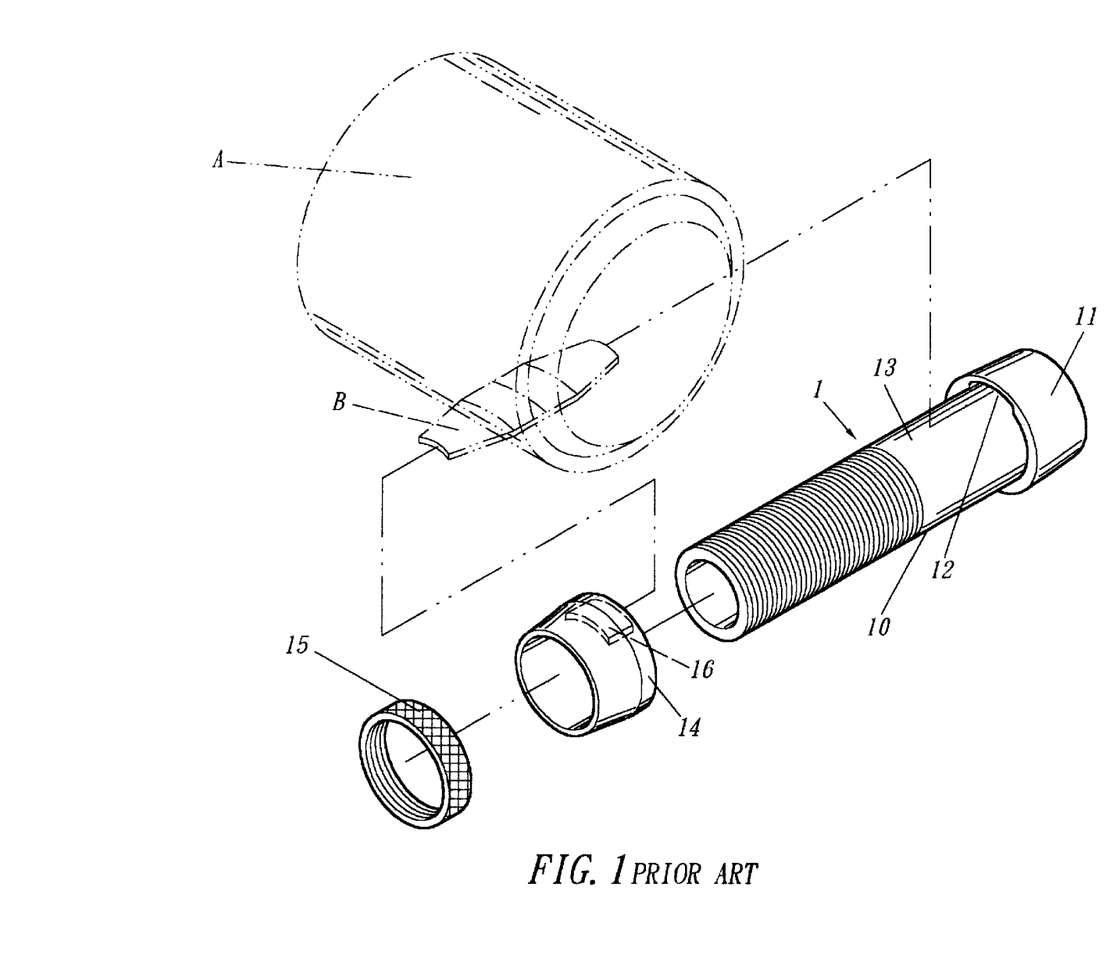
FIG. 1 is an exploded view of a conventional reel seat in three dimensions.
Figure 2:
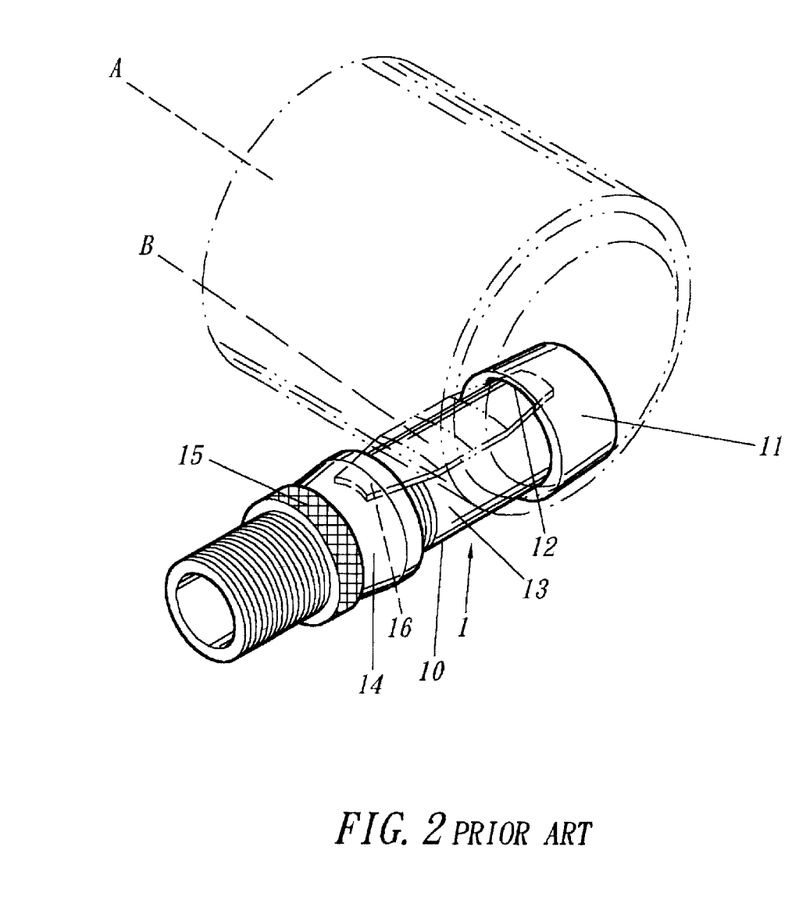
FIG. 2 is an assembled view of the conventional reel seat.

A generic reel seat 1 for fishing rod shown in FIGS. 1 and 2 usually comprises a thread body 10, wherein a fixed hood 11 is provided to a front end of the thread body 10; a groove gap 12 is formed in the fixed hood 11; a sliding hood 14 and a locking nut 15 are fixed at the other end of the thread body 10; and a groove gap 16 is disposed at an upper part in the inner wall of the sliding hood 14.

Figure 3:
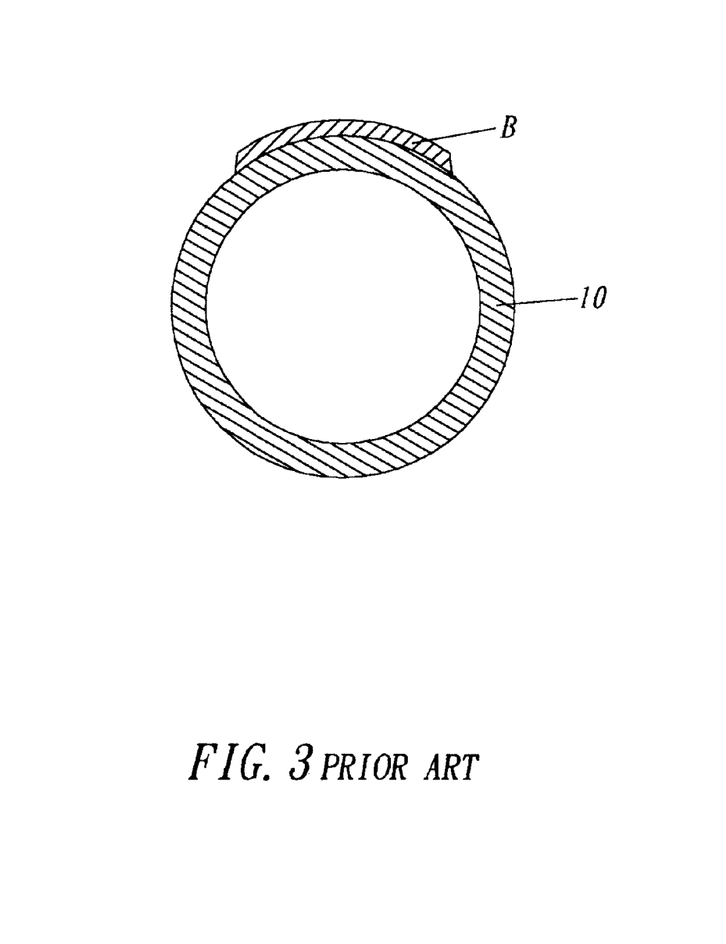
FIG. 3 is a cross-sectional view of the conventional reel seat.

In positioning a reel foot (A) to the reel seat 1, a user is requested to place two ends of a fixing piece (B) of the reel foot (A) in the groove gaps 12, 16, then turn the locking nut 15 to drive the sliding hood 14 to move forward together. However, as the groove gaps 12, 16 and the fixing piece (B) all are arcuate-shaped, the reel foot (A) may not be fixed effectively in a due position as shown in FIG. 3. In addition, it requires an extra procedure of aiming both the groove gaps 12, 16 on a line before mounting the fixing piece (B), and the user must loosen the locking nut 15 firstly for retreating the sliding hood 14, then he can separate the fixing piece (B) from the reel seat 1.

In view of abovesaid imperfection, this invention is to provide an improved mechanism pertaining to the subject matter in the hope that it would be helpful in some respects to people's daily living.

SUMMARY OF THE INVENTION

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

Figure 4:
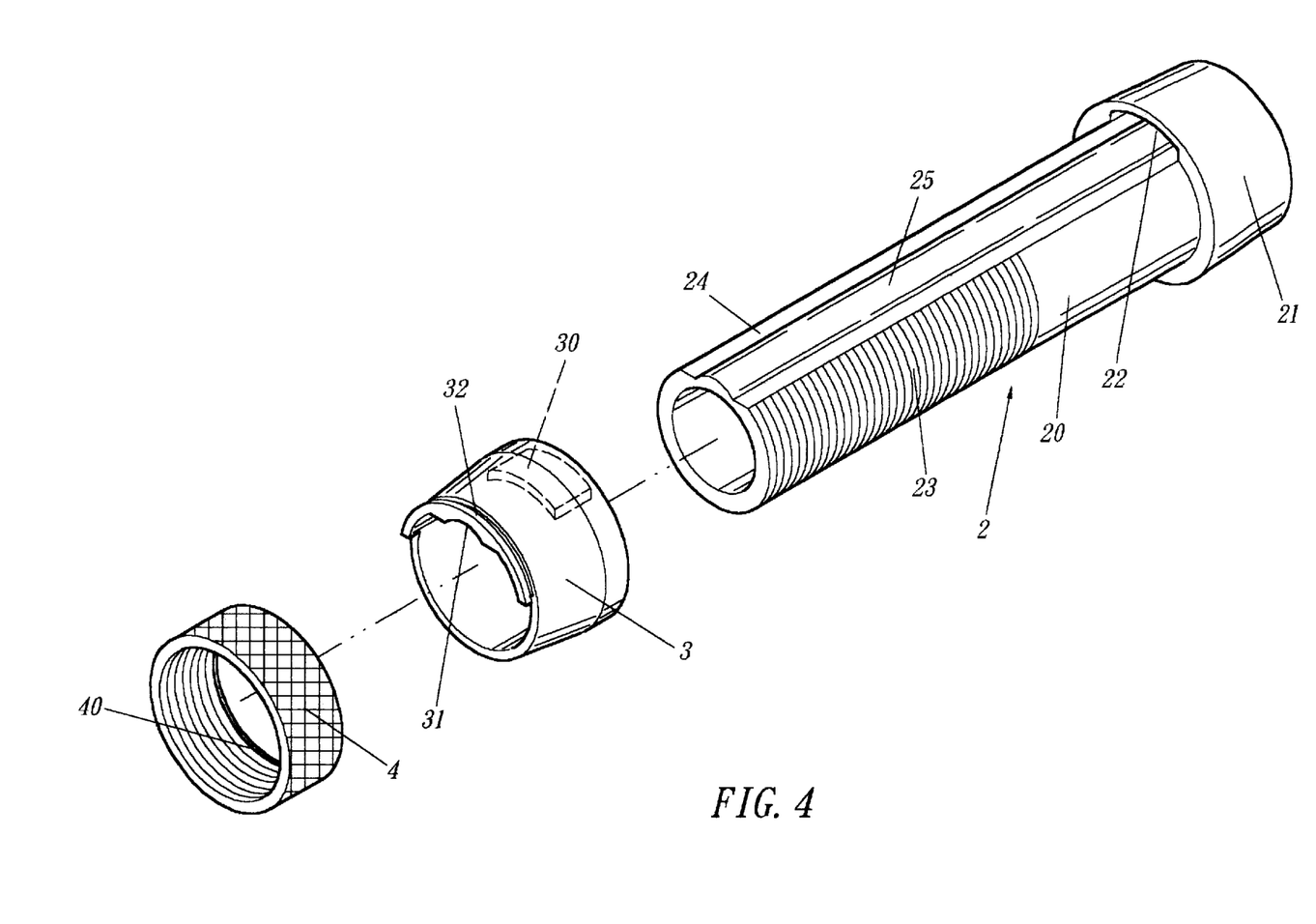
FIG. 4 is an exploded view of a reel seat of this invention in three dimensions.

A reel-seat assembly of this invention shown in FIG. 4 mainly comprises a reel seat 2 having a thread body 20 and a fixed hood 21 disposed at an front end of the thread body 20; a groove gap 22 reserved in an upper part of the inner wall of the fixed hood 21; a thread segment 23 formed at a rear-half part of the thread body 20; a flat part 24 disposed on the thread body 20; an arcuate slat 25 protrusively located on the flat part 24; a locking nut 4 with a recessed choking groove 40 disposed at its front end for locking to the thread segment 23 of the thread body 20; and a sliding hood 3 sheathed on the flat part 24. The sliding hood 3 is substantially a tapered ferrule provided with a groove gap 30 at a position corresponding and opposite to the groove gap 22 of the fixed hood 21. An arcuate groove 31 matchable to the arcuate slat 25 of the thread body 20 is arranged at a rear end of the sliding hood 3, and an arcuate choking block 32 is also disposed at the rear end of the sliding hood 3.

Figure 5:
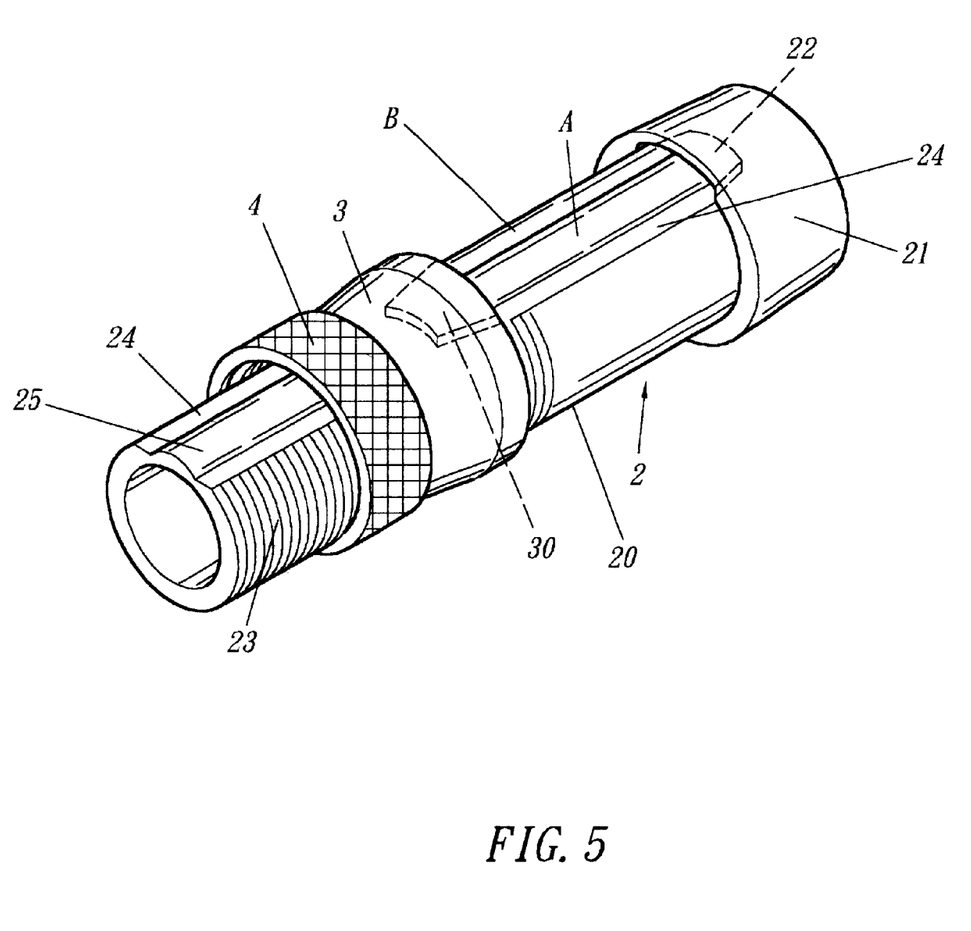
FIG. 5 shows an assembled reel seat of this invention in three dimensions.
Figure 6:
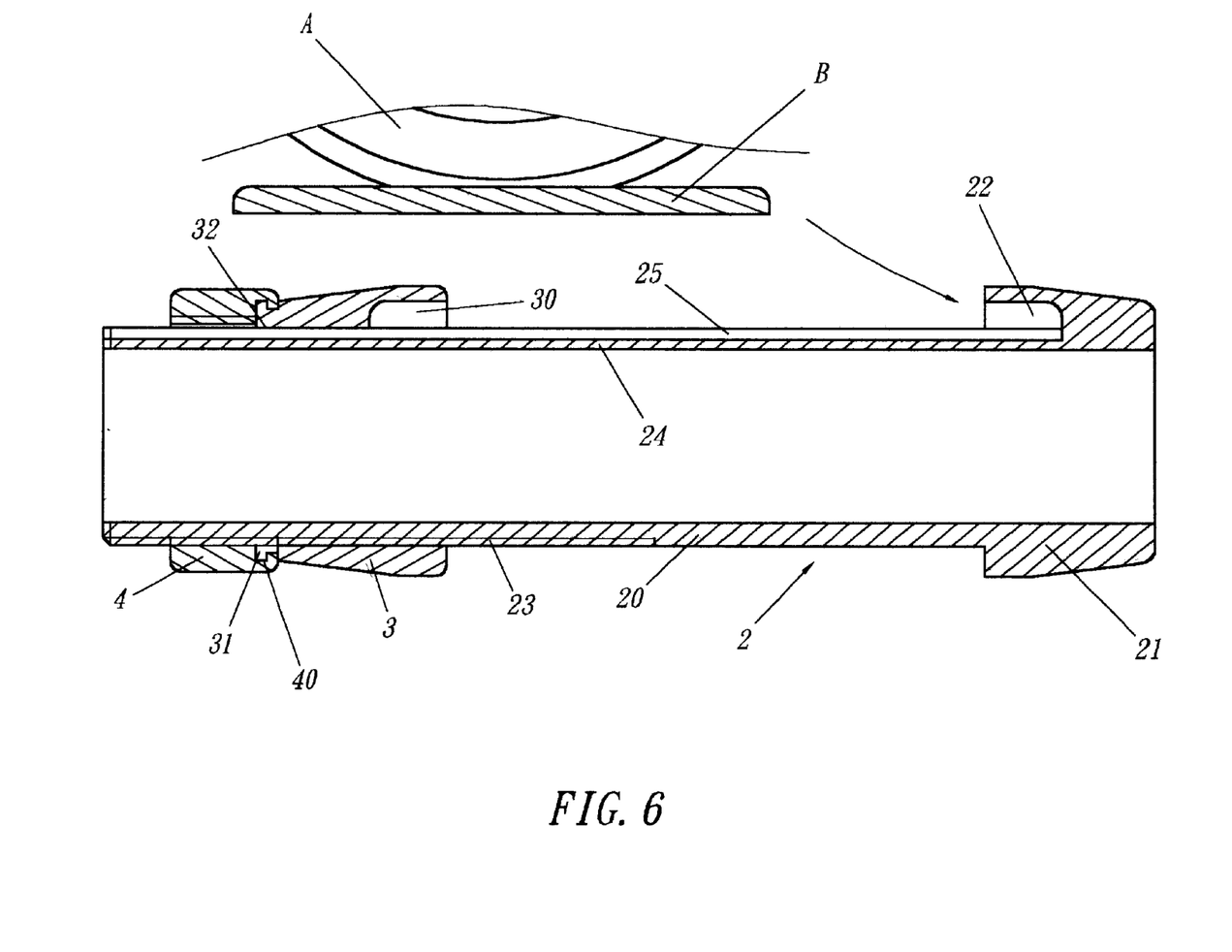
FIG. 6 is a cutaway sectional view of a reel seat of this invention before assembled with a reel foot and a fixing plate.

When assembling as shown in FIGS. 5, 6, the procedure is firstly to: engage the choking block 32 of the sliding hood 3 with the choking groove 40 of the locking nut 4; then swivel the locking nut 4 to collar the sliding hood 3 onto the flat part 24 of the thread body 20 to allow the arcuate groove 31 of the sliding hood 3 to match with the arcuate slat 25 and thereby prohibit the sliding hood 3 from revolving so that the groove gaps 20, 30 can stand on a line to watch each other remotely; and finally, swivel to mesh the locking nut 4 with the thread segment 23 of the thread body 20.

Figure 7:
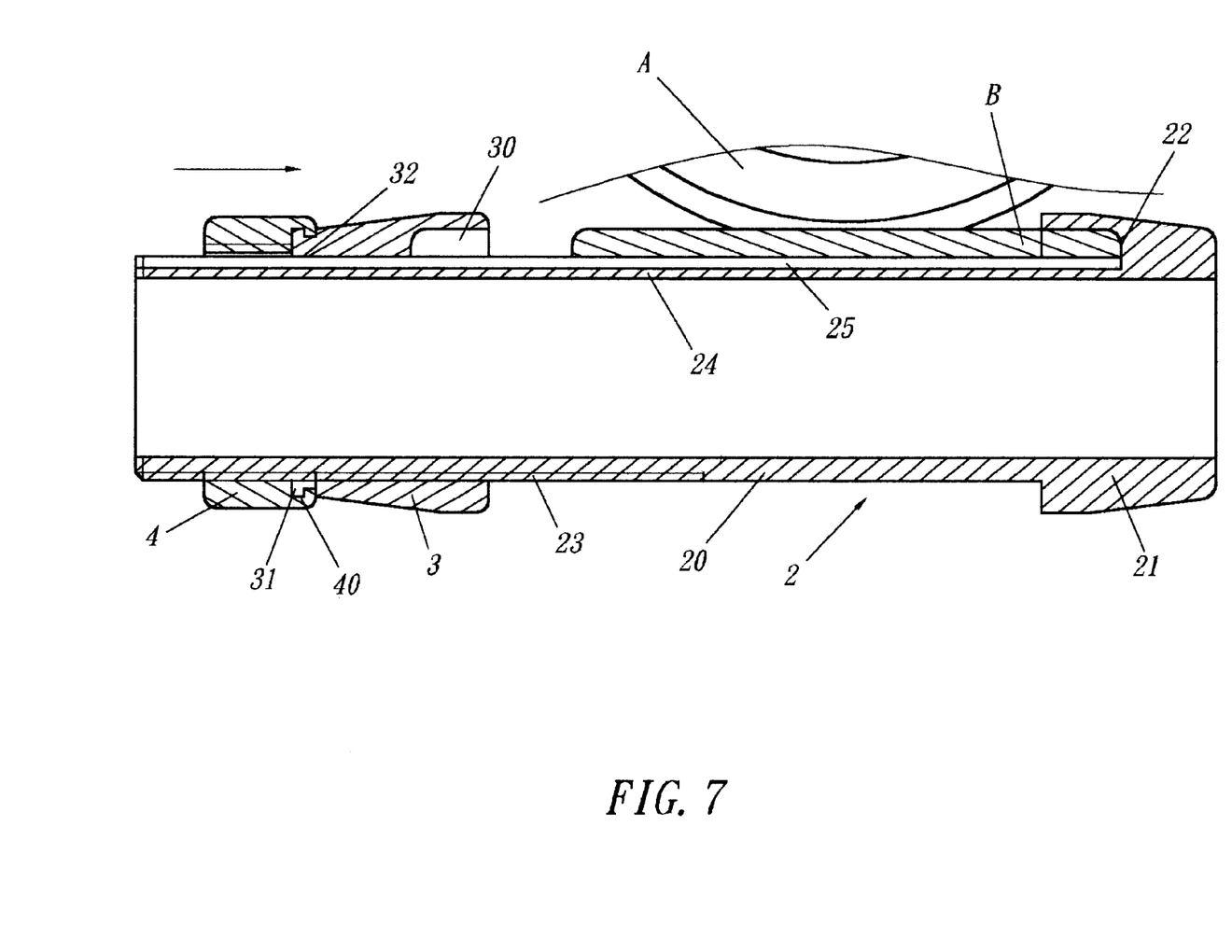
FIG. 7 is a cutaway sectional view of the reel seat of this invention under assembling.
Figure 8:
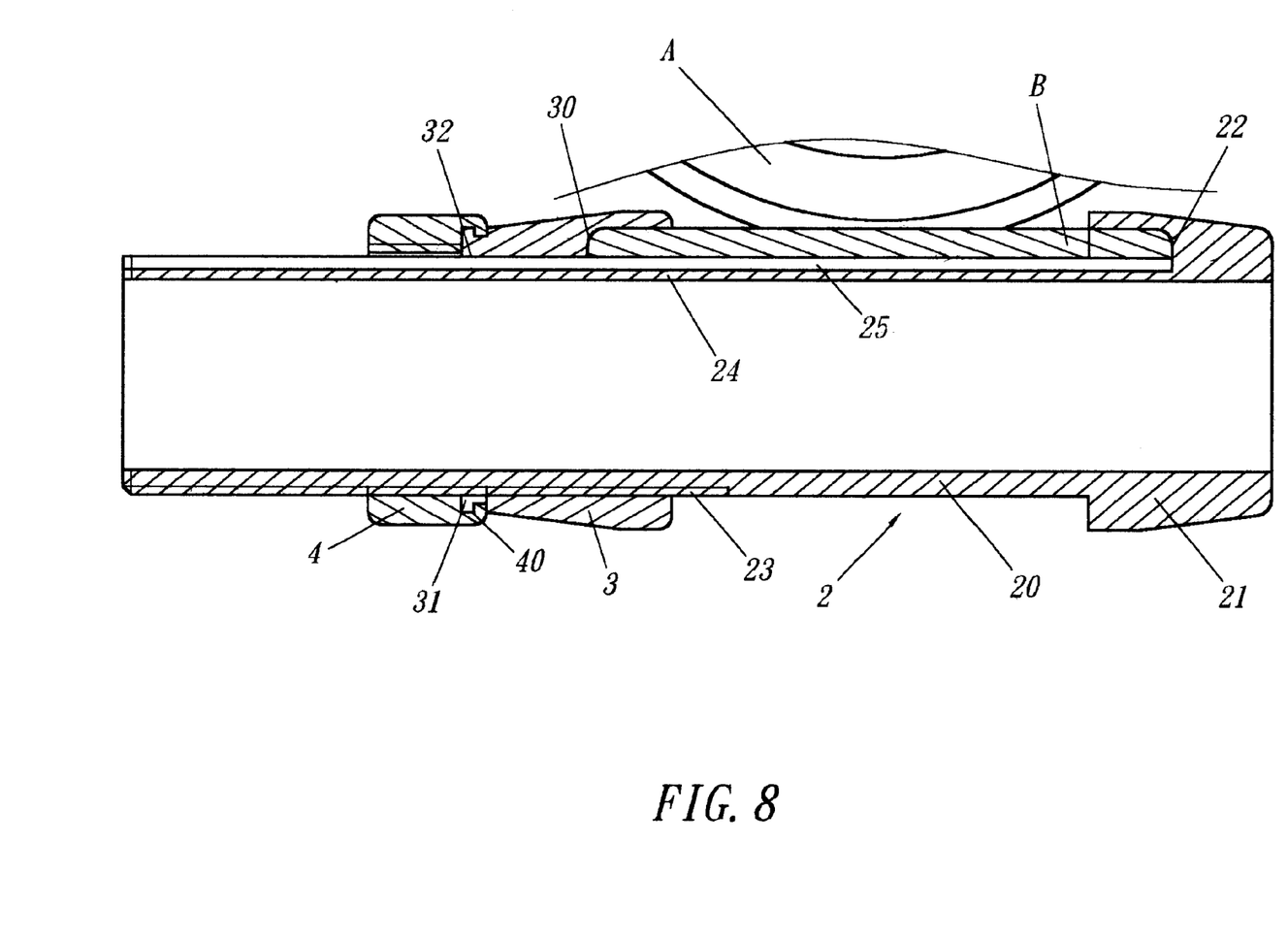
FIG. 8 is a cutaway sectional view of an assembled reel seat of this invention.

In application of this invention, as illustrated in FIGS. 7, 8, a user is supposed to:

place a fixing piece (B) of a reel foot (A) flat on the flat part 24 of the thread body 20 and the arcuate slat 25;

insert one end of the fixing piece (B) in the groove gap 22 of the fixed hood 21;

swivel the locking nut 4 to enable the choking groove 40 to prop against the choking block 32 of the sliding hood 3 to ensure that the arcuate groove 31 of the sliding hood 3 will go straightforward along the arcuate slat 25 until the other end of the fixing piece (B) is completely embedded in the groove gap 30 of the sliding hood 3.

Figure 9:
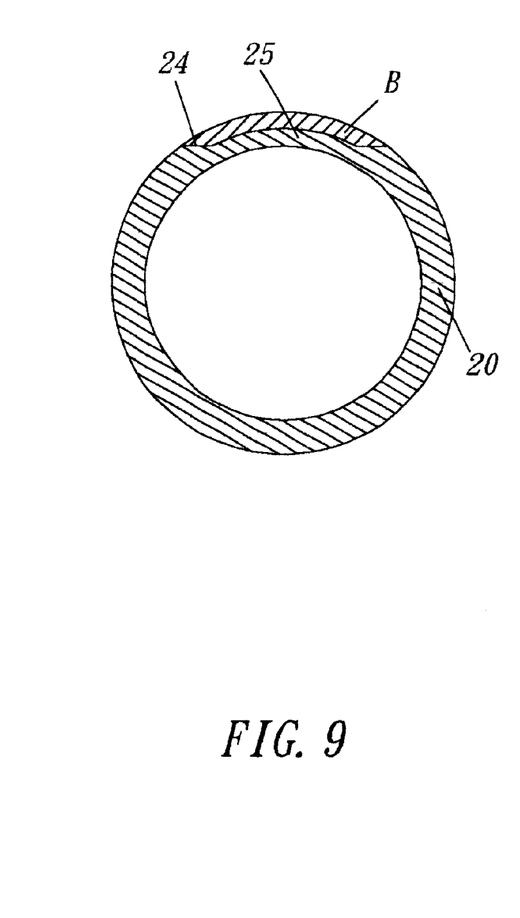
FIG. 9 is a cross-sectional view of the assembled reel seat of this invention.

The fixing piece (B) is forbidden from turning around as it has been closely attached onto the arcuate slat 25 as illustrated in FIG. 9. On the contrary, when dismount of the reel foot (A) is desired, the user is requested to swivel the locking nut 4 reversely to have the choking groove 40 dragged the choking block 32 backward in linear motion.

In summarizing the abovesaid, the merits of this invention may be considered as the following:

1. The fixing piece (B) of the reel foot can be attached flat on the flat part and the arcuate slat on the thread body to prevent the reel foot (A) from revolving.
2. The arcuate groove in the inner wall of the sliding hood is matchable with the arcuate slat on the thread body so that the sliding hood would not revolve in order to keep the groove gaps on a line.
3. As the choking block of the sliding hood is embedded in the choking groove of the locking nut, both the sliding hood and the locking nut will move forward or backward together without causing revolution of the sliding hood.

In the above described, at least one preferred embodiment has been elucidated with reference to drawings annexed, it is apparent that numerous variations or modifications may be made without departing from the true spirit and scope thereof, as set forth in the claims below.

What is claimed is:

1. A reel-seat assembly, comprising:

a reel seat having a thread body, wherein the thread body is provided with a fixed hood disposed at a front end thereof; a groove gap is formed in an upper part of an inner wall of the fixed hood; a thread segment is disposed at a rear-half part of the thread body; and a flat part is arranged on a top portion of the thread body while an arcuate slat is protrusively formed on the flat part;

a sliding hood sheathed on the flat part of the thread body, wherein a groove gap is formed at an upper part in an inner wall of the sliding hood; an arcuate groove is located behind the groove gap; and a choking block is protrusively disposed at a rear end of the sliding hood; and a locking nut screw-jointed with the thread segment of the thread body, wherein the locking nut is provided with a choking groove located in an inner wall at the front end of the locking nut.

* * * * *